M. F. BORING.
LID FOR MILK CROCKS.
APPLICATION FILED DEC. 17, 1912.
1,064,603.
Patented June 10, 1913.
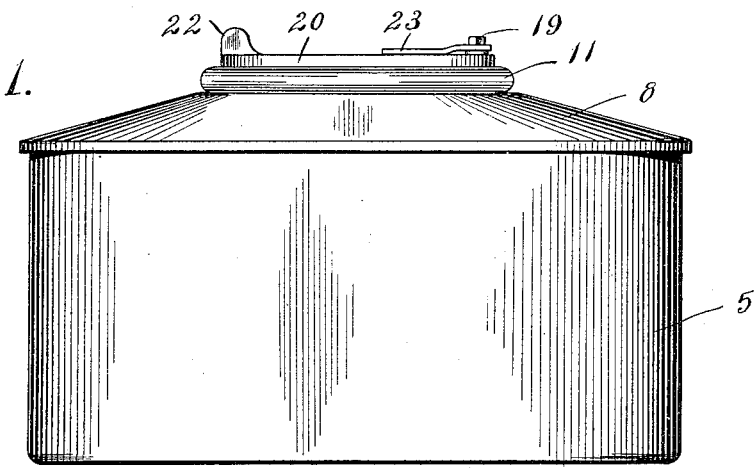
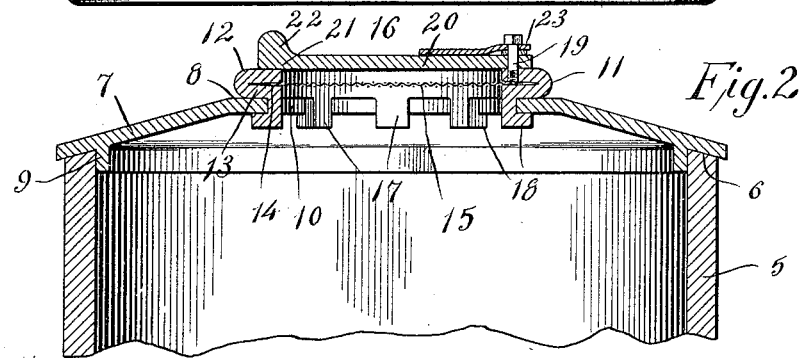
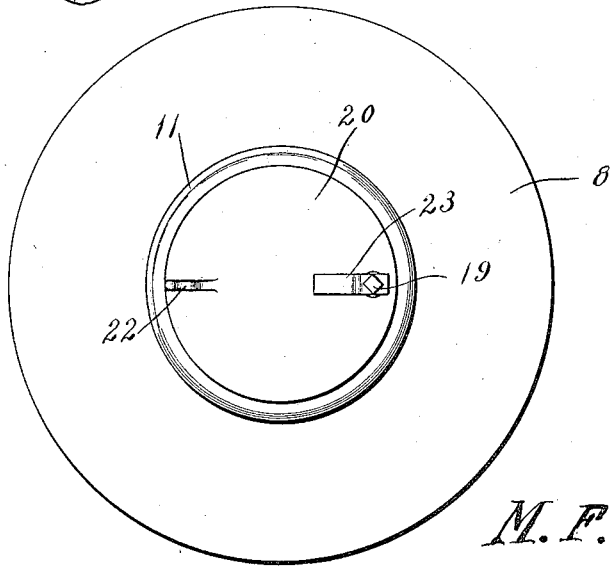
Inventor
M. F. Boring
Witnesses
By Victor J. Evans.
Attorney

UNITED STATES PATENT OFFICE.

MARY FLORENCE BORING, OF WASHINGTON, INDIANA.

LID FOR MILK-CROCKS.

1,064,603.  Specification of Letters Patent.  Patented June 10, 1913.

Application filed December 17, 1912. Serial No. 737,332.

*To all whom it may concern:*

Be it known that I, MARY FLORENCE BORING, a citizen of the United States, residing at Washington, in the county of Daviess and State of Indiana, have invented new and useful Improvements in Lids for Milk-Crocks, of which the following is a specification.

The general object of this invention is the provision of a crock particularly adapted for containing fresh milk and including means for permitting the escape of the animal heat from the interior thereof to the exclusion of any foreign particles such as dirt and the like, and to this end the invention consists in providing certain novel constructions and arrangements of parts, which will be fully described hereinafter and then pointed out in the appended claims.

In carrying out the object of the invention generally stated above, it will be understood, of course, that the essential features thereof are susceptible of changes in details and structural arrangements, one preferred and practical embodiment being shown in the accompanying drawing.

Figure 1 is a side elevation of the crock constructed in accordance with the invention. Fig. 2 is a central vertical sectional view thereof. Fig. 3 is a top plan view.

Referring more particularly to the accompanying drawing in which like reference characters designate similar parts it will be seen that the invention comprises a body 5 which may be made of any desired or suitable material and which has its top edge beveled as indicated at 6 to receive the underside of the inclined portion 7 of the top 8, said portion 7 being provided with an annular depending flange 9 adjacent the outer periphery thereof which is adapted to engage the inner wall of the body 5 and thereby prevent lateral displacement of the said top when in a closing position.

The top 8 is provided with a centrally located opening 10 adapted to receive the elements 11 which may be made of any suitable material such as metal. The said element 11 is adapted to be bent upon itself to provide the upper and lower members 12 and 13 respectively, said members forming therebetween an annular groove 14 which is adapted to receive a wire screen 15 and retain the same in position so as to prevent egress of any foreign particles into the body 5 through the opening 16 in said element 11. Depending from the lower member 13 at the inner edge thereof are a plurality of lugs 17 which are adapted to engage the wall of the opening 10 in the top 8, said lugs being bent laterally at their extremities to provide the extensions 18 which engage the under surface of the top 8. It will thus be evident that through the medium of this construction, the element 11 will be securely retained in engagement with the top 8, whereby displacement of said element will be absolutely prevented.

The member 12 of the element 11 has rising therefrom a pivot pin 19 which is adapted to receive thereon the cover 20 which is adapted to close the opening 16 in the said element. The cover 20 is provided, at a point diametrically opposite its pivot, with an extension 21 having the extremity thereof bent laterally to provide a finger hold 22 whereby the swinging of said cover is facilitated. In order to retain the cover 20 in an adjusted position, a leaf spring 23 is also secured at one end to the pivot 19 and said spring is adapted to bear against the outer surface of the cover 20 and frictionally engage the same and thus prevent any undue movement thereof.

From the foregoing description taken in connection with the accompanying drawing, it will be seen that the invention contemplates providing a device which is simple in construction thus reducing the cost of manufacture of the same to a minimum and which is durable and effective in carrying out the purpose for which it is designed.

What is claimed is:—

1. A crock comprising a body portion, a top therefor having a depending annular flange adapted to engage said body, said top being provided with a central opening, an element mounted in said opening and including superimposed members forming an annular groove therebetween, a screen mounted in said groove, and lugs depending from one of said members and adapted to engage the wall of the opening in said top and the under surface of the latter.

2. A crock comprising a body portion, a top therefor having a depending annular flange adapted to engage said body, said top being provided with a central opening, an element mounted in said opening and including superimposed members forming an annular groove therebetween, a screen mounted in said groove, lugs depending from one of said members and adapted to engage the wall of the opening in said top and the under surface of the latter, and a closure for said element pivoted to the other superimposed member.

3. A crock comprising a body portion, a top therefor having a depending annular flange adapted to engage said body, said top being provided with a central opening, an element mounted in said opening and including superimposed members forming an annular groove therebetween, a screen mounted in said groove, lugs depending from one of said members and adapted to engage the wall of the opening in said top and the under surface of the latter, a closure for said element pivoted to the other superimposed member, and means engaging said closure for retaining the same in an adjusted position.

In testimony whereof I affix my signature in presence of two witnesses.

MARY FLORENCE BORING.

Witnesses:
MARTHA M. FRANKLIN,
EDITH M. STAFFORD.

Copies of this patent may be obtained for five cents each, by addressing the "Commissioner of Patents, Washington, D. C."